Oct. 6, 1936.    F. HODGKINSON    2,056,519
FORCED FLOW STEAM GENERATOR
Filed May 25, 1934
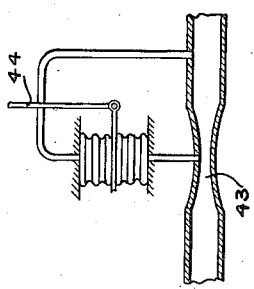
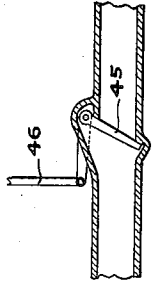
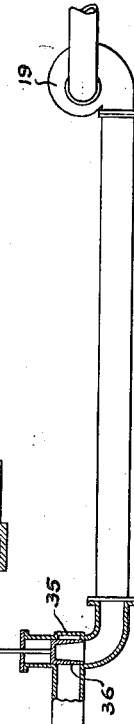
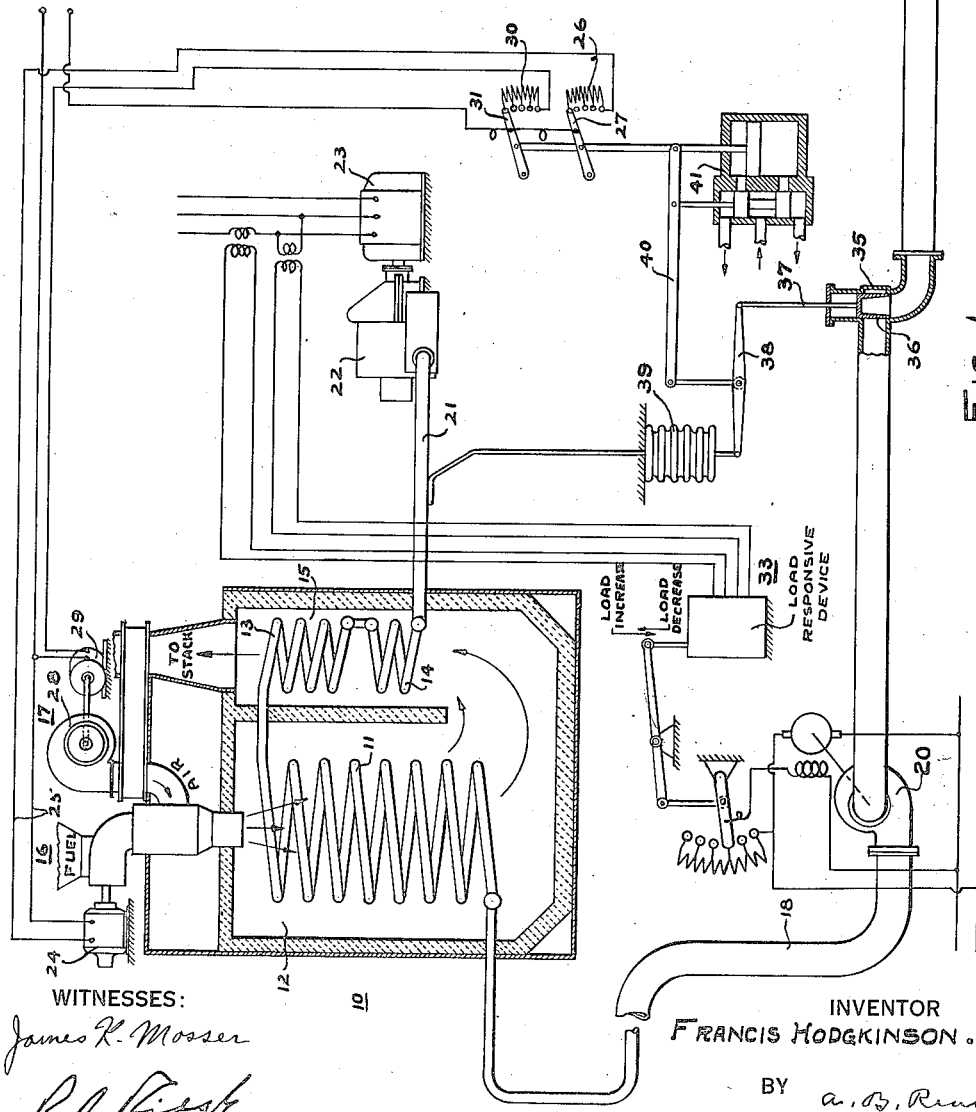
INVENTOR
FRANCIS HODGKINSON.
BY
ATTORNEY Patented Oct. 6, 1936

2,056,519

UNITED STATES PATENT OFFICE 2,056,519

FORCED FLOW STEAM GENERATOR

Francis Hodgkinson, Philadelphia, Pa., assignor to Westinghouse Electric & Manufacturing Company, East Pittsburgh, Pa., a corporation of Pennsylvania Application May 25, 1934, Serial No. 727,413

5 Claims. (Cl. 122—448)

My invention relates to tubular boilers or steam generators of the forced-flow type wherein the combustion media and water supplies are adjusted in accordance with the desired output, and it has for its object to provide means affording protection to the fuel-heated elements in case of failure of the water supply.

A further object of my invention is to provide a forced-flow tubular steam generator with means for supplying water thereto including a device responsive to flow for exerting a controlling effect on the combustion media supply.

These and other objects are effected by my invention as will be apparent from the following description and claims taken in connection with the accompanying drawing, forming a part of this application, in which:

Fig. 1 is a diagrammatic view of a steam generator having my improvement applied thereto; and, Figs. 2 and 3 show modified forms of flow responsive devices.

Referring to the drawing more in detail, in Fig. 1, I show a steam generator, at 10, including a tubular heat absorbing element 11 arranged, for example, in the radiant heat chamber 12 and tubular heat absorbing elements 13 and 14 arranged, for example, in the convection or contact heating chamber 15. Combustion media, that is, fuel and air, are supplied to the chamber 13 by any suitable means, indicated diagrammatically, at 16 and 17, respectively.

Water is supplied to the tubular elements through a supply line 18 connected to any suitable pressure supply means, for example, the pumps 19 and 20. Steam delivered by the generator is supplied by a conduit or line 21 to a suitable consuming device, for example, a turbine 22 driving a generator 23.

As is well known with steam generators of this type, the supplies of fuel, air, and water must be controlled to suit the demand. In the drawing, the apparatus, at 16, is shown, for example, as being of the pulverized-fuel feeding type, driven by a variable speed electric motor 24 whose supply circuit 25 contains a suitable speed controlling resistance or rheostat, at 26, having a movable contact element 27. Air is supplied in a variable manner by the apparatus, at 17, consisting, for example, of a blower 28 driven by a variable speed motor 29 having a controlling resistance or rheostat, at 30, provided with a movable contact element 31.

Any suitable means responsive to the load may be used for controlling the water supply. For example, in Fig. 1, I show the generator 23 provided with a load-responsive device, at 32, which controls the speed of the pump 20 to secure water pressure in the steam generator in accordance with the load.

Referring now to the flow-responsive and thermostatic means for controlling the supply of fuel and air, in Fig. 1, I show a body 35 containing a movable flow-responsive abutment 36 connected to a rod 37. The rod 37 is pivotally connected to one end of a lever 38 and the other end of the latter is connected to a thermostat 39 responsive to the temperature of steam delivered by the boiler. The lever 38 is connected, through a lever 40, to the servo-motor 41, which actuates the speed control contacts 27 and 31. The arrangement of the leverage, the flow responsive device, and the thermostat are such that, with increase in flow or decrease in temperature, the fuel and air supply rates are increased and vice versa. Also, it will be apparent that, if, for any reason, the water supply should fail or have its flow reduced below a predetermined rate, the flow-responsive device will operate through the means referred to so as to restrict the fuel and air to such an extent as to avoid injury to fuel-heated elements.

In Fig. 2, I show a modified form of flow-responsive device 43 of the Venturi flow meter type having an actuated element 44 arranged for connection to the lever 38 in a manner similar to that of the flow responsive device of Fig. 1.

In Fig. 3, I show a further embodiment of the flow-responsive device consisting of a movable flap element 45 arranged in the feed water stream and movable thereby to actuate the operated element 46, the latter being connected to the controlling operating mechanism in a manner similar to the flow-responsive device of Fig. 1.

From the apparatus described, it will be apparent that I have provided a boiler of the forced-flow type wherein the pressure is caused to vary in accordance with the power demand. If there is an increase in demand for power, the pressure increases, and vice versa. With change in the quantity of working fluid being circulated incident to changes in power demand, the flow-responsive device operates to adjust the supplies of fuel and air to suit the power demand. Also, the thermostat associated with the boiler assures that steam may be supplied under variable pressure and at substantially constant temperature to the turbine, an increase in temperature causing the fuel and air supply rates to be decreased and vice versa.

While I have shown my invention in three forms, it will be obvious to those skilled in the art that it is not so limited, but is susceptible of various changes and modifications, without departing from the spirit thereof and I desire, therefore, that only such limitations shall be placed thereupon as are imposed by the prior art or as are specifically set forth in the appended claims.

What I claim is:

1. The combination with a steam generator including heating surface and combustion apparatus for supplying heat thereto, the steam generator supplying steam to a consuming device, of means for supplying feed water to the heating surface, means for supplying combustion media to the combustion apparatus, means dependent on the demand of the consuming device for controlling the feed water supply means to vary the rate of supplying feed water in accordance with the demand, means responsive to the temperature of generated steam so as to control the combustion media supply means in such manner as to maintain steam supplied from the generator to the consuming device at a substantially constant temperature, and means responsive to reduction in flow of feed water to the generator to control the combustion media supply means so as to diminish the supply of combustion media to the combustion apparatus in order to prevent overheating of the heating surface.

2. The combination with a steam generator including tubular heating surface and combustion apparatus for supplying heat thereto, the steam generator supplying steam to a consuming device, of means including a feed pump for supplying feed water to the heating surface, means for supplying combustion media to the combustion apparatus, means responsive to consuming device load for controlling the feed pump to increase the flow and pressure of feed water supplied to the heating surface with increase in load and vice versa, and means actuated by and in response to change in flow of feed water supplied to the heating surface to change the supply of combustion media to the combustion apparatus such that with an increase in flow of feed water the supply of combustion media is increased and vice versa.

3. The combination with a steam generator including heating surface and combustion apparatus for supplying heat thereto, the steam generator supplying steam to a consuming device, of means for supplying feed water to the heating surface, means for supplying combustion media to the combustion apparatus, means dependent on the demand of the consuming device for controlling the feed water supply means to vary the rate of supplying feed water in accordance with the demand, and a control system for the combustion media supply means, said system including means actuated by and in response to change in flow of feed water to the heating surface for changing the rate of supplying combustion media such that with an increase in feed water flow the rate of supplying combustion media is increased and vice versa and thermostatic means responsive to the temperature of steam leaving the generator for controlling the rate of supplying combustion media such that the temperature of steam supplied by the generator to the consuming device is maintained substantially constant.

4. The combination with a steam generator including heating surface and combustion apparatus, the steam generator supplying steam to a consuming device, of means including a feed pump for supplying feed water to the heating surface, means for supplying combustion media to the combustion apparatus, means responsive to the consuming device load for controlling the feed pump to increase the flow and pressure of feed water supplied to the heating surface with increase in load and vice versa, and a control system for the combustion media supply means, said system including means responsive to change of flow of feed water to change the rate of supplying combustion media to the combination apparatus such that, with increase in flow of feed water, the supply of combustion media is increased and vice versa, and thermostatic means for controlling the combustion media supply means so as to maintain the temperature of steam leaving the generator substantially constant.

5. The combination with a steam generator including heating surface supplying steam to a consuming device, an inlet conduit for supplying feed water to the heating surface, combustion apparatus for supplying heat to the heating surface, means for supplying combustion media to the combustion apparatus, a feed pump incorporated in the inlet conduit for supplying water under pressure to the heating surface, means responsive to the consuming device load demand to control the pump to vary the steam pressure in accordance with the load, and means responsive to the flow of water in said inlet conduit to restrict the supply of combustion media to the combustion apparatus in order to avoid overheating of the heating surface due to insufficient flow of water in said inlet conduit.

FRANCIS HODGKINSON.